Figure 1:
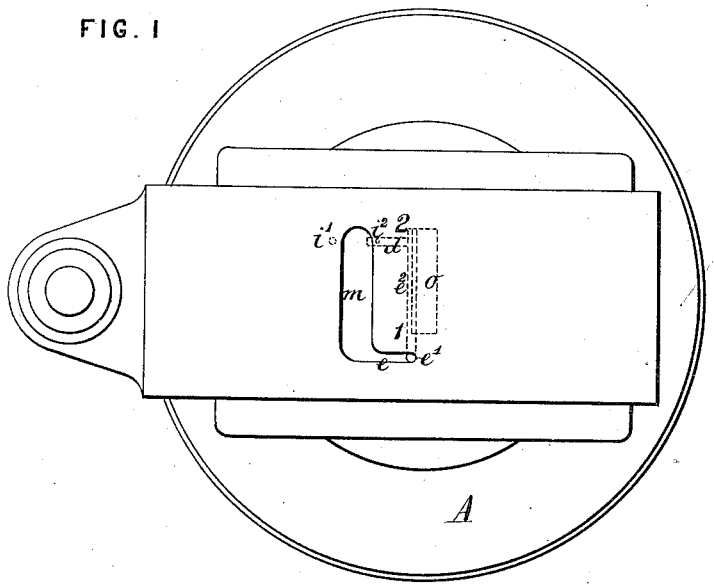

(No Model.) 4 Sheets—Sheet 1.

N. A. OTTO.
SLIDE AND PASSAGE FOR GAS MOTOR ENGINES.

No. 335,038. Patented Jan. 26, 1886.

Witnesses.
Jn̄o. L. Coombs
Robert Evrett.

Inventor,
Nicolaus A. Otto.
By James L. Norris.
Atty.

(No Model.) 4 Sheets—Sheet 2.
N. A. OTTO.
SLIDE AND PASSAGE FOR GAS MOTOR ENGINES.
No. 335,038. Patented Jan. 26, 1886.
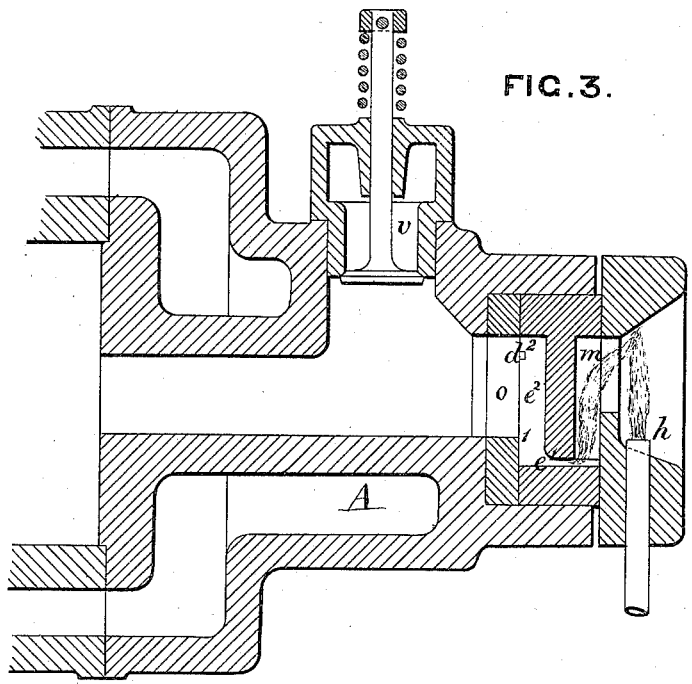
FIG. 3.
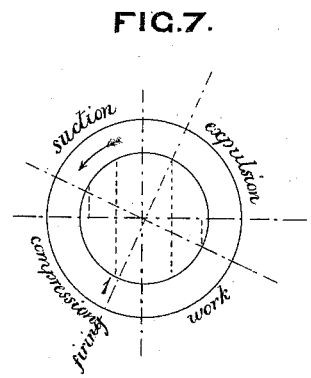
FIG. 7.
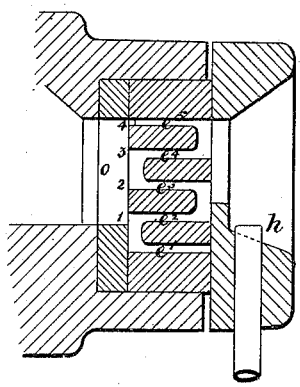
FIG. 6.
FIG. 4.
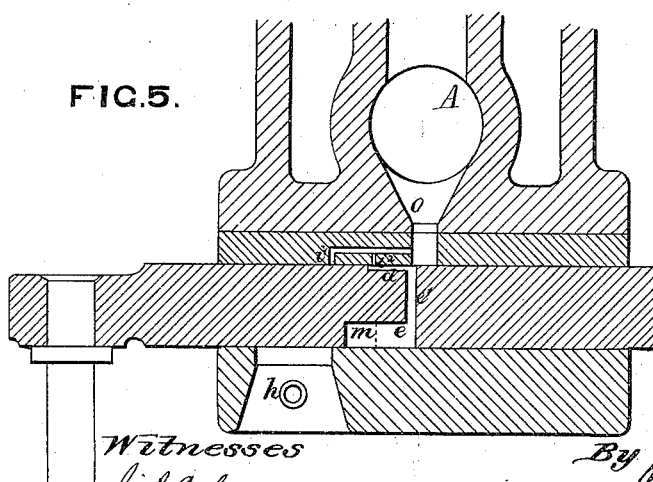
FIG. 5.
Witnesses
Jo. L. Coombs
Robert Everett
Inventor
Nicolaus A. Otto
By James L. Norris
Atty.

(No Model.)   4 Sheets—Sheet 3.

N. A. OTTO.
SLIDE AND PASSAGE FOR GAS MOTOR ENGINES.

No. 335,038.  Patented Jan. 26, 1886.

Witnesses,  
Jo. L. Coombs  
Robert Corrett

Inventor  
Nicolaus A. Otto.  
By James L. Norris  
Atty.

(No Model.) 4 Sheets—Sheet 4.
N. A. OTTO.
SLIDE AND PASSAGE FOR GAS MOTOR ENGINES.
No. 335,038. Patented Jan. 26, 1886.
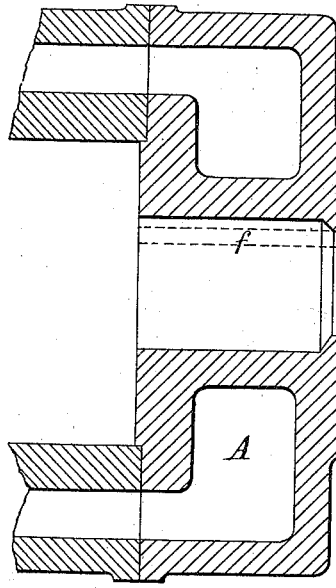
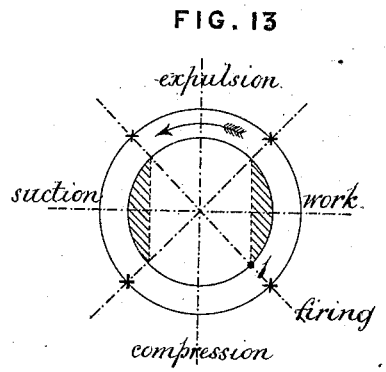
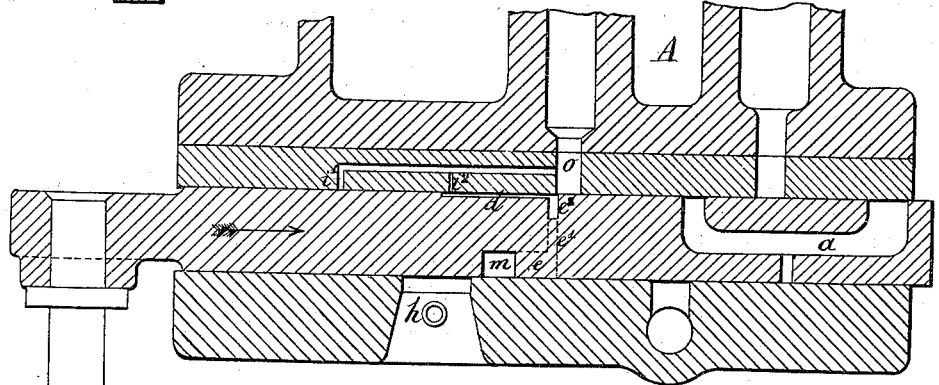
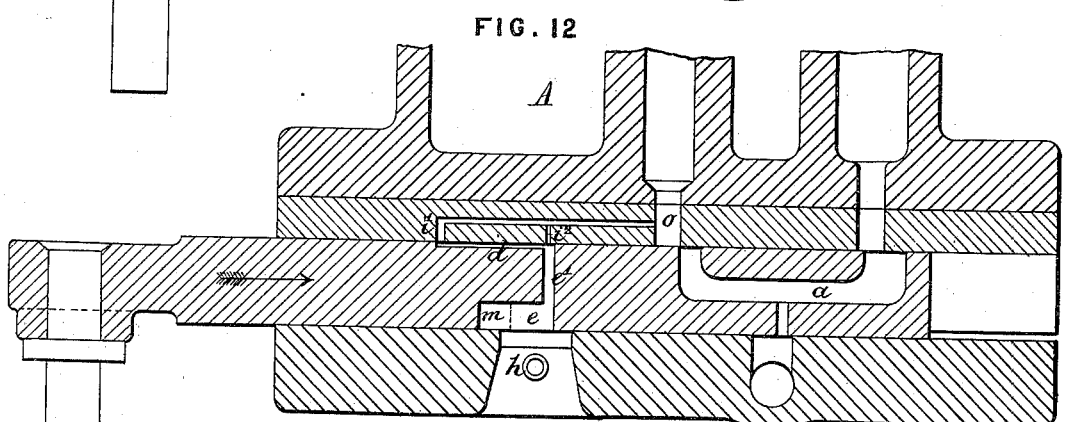
Witnesses.
Jo. L. Coombs
Robert Everett
Inventor.
Nicolaus A. Otto.
By James L. Norris.
Atty.
N. PETERS, Photo-Lithographer, Washington, D. C.

UNITED STATES PATENT OFFICE.

NICOLAUS AUGUST OTTO, OF DEUTZ-ON-THE-RHINE, GERMANY, ASSIGNOR TO THE GASMOTOREN FABRIK DEUTZ, OF SAME PLACE.

SLIDE AND PASSAGE FOR GAS-MOTOR ENGINES.

SPECIFICATION forming part of Letters Patent No. 335,038, dated January 26, 1886.

Application filed October 26, 1885. Serial No. 180,980. (No model.)

*To all whom it may concern:*

Be it known that I, NICOLAUS AUGUST OTTO, a citizen of Prussia, residing at Deutz-on-the-Rhine, in the German Empire, have invented a new and useful Improvement in the Slides and Passages of Gas-Motor Engines, of which the following is a specification.

This invention relates to that description of slides for gas-motor engines wherein a cavity or passage is charged with combustible mixture of gas and air, which, after being ignited by a permanent gas-flame, is conveyed by the slide to the port of the engine-cylinder, so as to fire the combustible charge therein. In such slides as heretofore constructed the said cavity or passage is made of comparatively short length and large sectional area, so that the small charge of combustible mixture contained therein is liable, when the engine is running at a slow speed, to burn out and become extinguished before it is brought to the cylinder-port, and thus the charge may fail to be fired.

The present invention has for its object to prevent the possibility of this occurring; and it consists in making the passage or cavity that contains the firing-charge of considerable length and of comparatively small sectional area, whereby the combustion of the gaseous charge contained therein will be made to take place very slowly, and consequently the duration of such combustion will extend over a sufficient space of time to insure the ignition of the cylinder charged thereby, even when the slide is moving at a very slow speed. The said passage or cavity is also so arranged that when brought before the cylinder-port it is made to communicate with the same either along a considerable part or at several points of its length, so as to insure the contact of the igniting-flame with the cylinder-charge without requiring the flame to have passed through the entire length of the passage for that purpose.

The accompanying drawings show various arrangements for carrying the above-described invention into effect.

Figure 2:
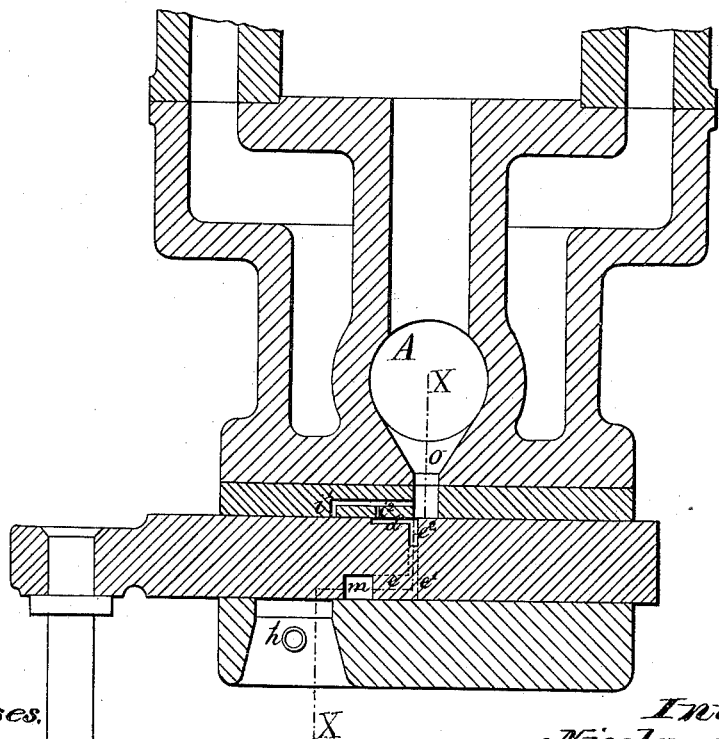

In the arrangement shown in elevation at Figure 1, sectional plan at Fig. 2, and cross-section on line X X at Fig. 3 the engine is assumed to be of the kind in which the combustible charge is admitted to the cylinder and the slide cavity or passage through a lift-valve, $v$, and is then compressed by the instroke of the piston. The firing-passage of the slide consists of the two opposite narrow but deep channels $e$ $e^2$ and the transverse passage $e'$, which connects the two. The channel $e$ communicates with the cavity $m$, in which, when the slide is in one position, the combustible mixture is brought in contact with the permanent gas-flame at $h$, so as to be ignited thereby, while when the slide is in another position the channel $e^2$ communicates along the part from 1 to 2 of its length with the port of the cylinder A, so that the flame existing at any point of such channel will ignite the charge.

In the modified construction shown at Figs. 4, 5, and 6 the igniting-passage is formed by the channel $e$, communicating with $m$, and by the several transverse passages $e'$ $e^2$ $e^3$ $e^4$ $e^5$, which are connected together in pairs by vertical passages alternately at opposite ends, so that when these passages are inclosed between the cylinder-face and the slide-cover a continuous zigzag passage is formed; but when the slide brings the igniting-passage opposite the cylinder-port $o$ (the communication with the flame $h$ being then cut off) the passage communicates with the port at the several points 1, 2, 3, and 4, so that the flame burning in any one of the passages $e'$ $e^2$ $e^3$ $e^4$ $e^5$ will effect the ignition of the cylinder-charge.

The action of the slide is as follows: The combustible charge being made to enter the cylinder through the valve $v$ when the slide is moved, so that the igniting-passage does not communicate with the port $o$, the charging of this passage with combustible mixture will only take place during the compressing-stroke, when a portion of the cylinder-charge will be forced through the narrow passage with openings $i'$ $i^2$ into the channel $d$ in the slide leading into the igniting-passage $e^2$, whence the gaseous mixture passes into the cavity $m$, where it is ignited by the flame $h$. As soon as by the movement of the slide the cavity $m$ becomes closed by the slide-cover, an equilibrium of pressure will be established in the cylinder firing passage and cavity $m$, and the flame in the latter will travel through the passage $e\ e'\ e^2$, Fig. 1, or through the passage $e\ e'\ e^2\ e^3\ e^4\ e^5$, Fig. 4, toward the cylinder.

As a considerable length of the passage is or various points thereof are now brought in communication with the cylinder-port $o$, the ignition of the cylinder-charge will be effected with certainty by the said flame existing at any point of the passage.

Fig. 7 shows a diagram of the slide's action. The crank working the slide makes one revolution while the engine-shaft makes two, the engine being of the class known as the "Otto" engine, in which a cycle of four strokes—namely, a suction-stroke, a compressing-stroke, a firing-stroke, and an expelling-stroke—occurs. The slide-crank is situated at right angles to the engine-crank, so that at the moment of firing the former is situated at the point 1.

Figure 8:
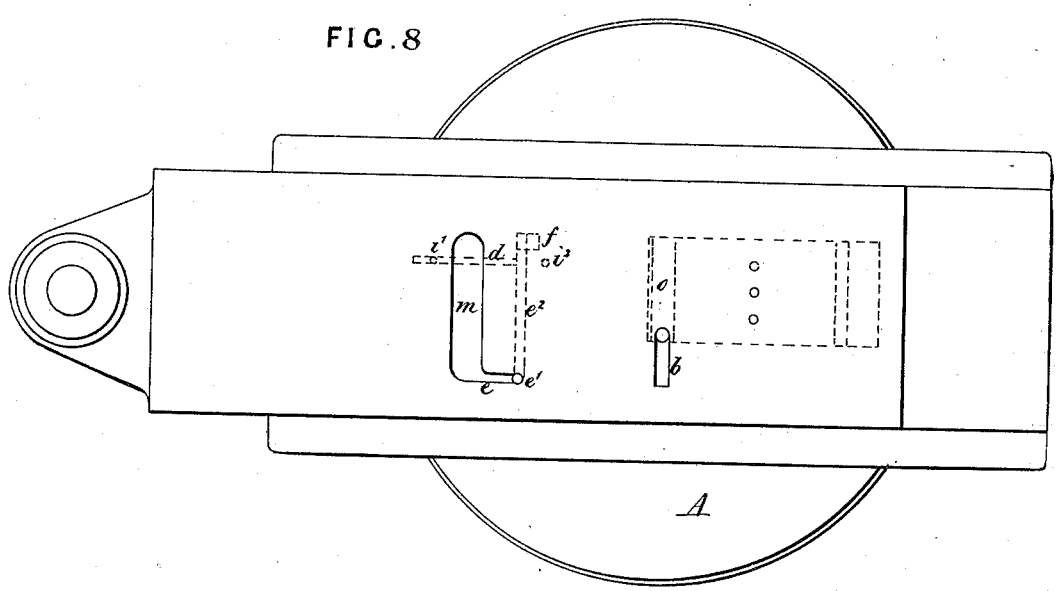

Figs. 8 to 12 show the application of the invention to engines constructed according to patent granted to N. A. Otto on the 14th of August, 1877, No. 194,047, and to patent granted to Otto and Crossley on the 23d of October, 1877, No. 196,473, in which the combustible charge passes into the cylinder through the slide. Fig. 8 shows an elevation, Fig. 9 a cross-section on line X X, Fig. 10, and Figs. 10, 11, and 12 horizontal sections, of the slide in different positions.

Figure 10:
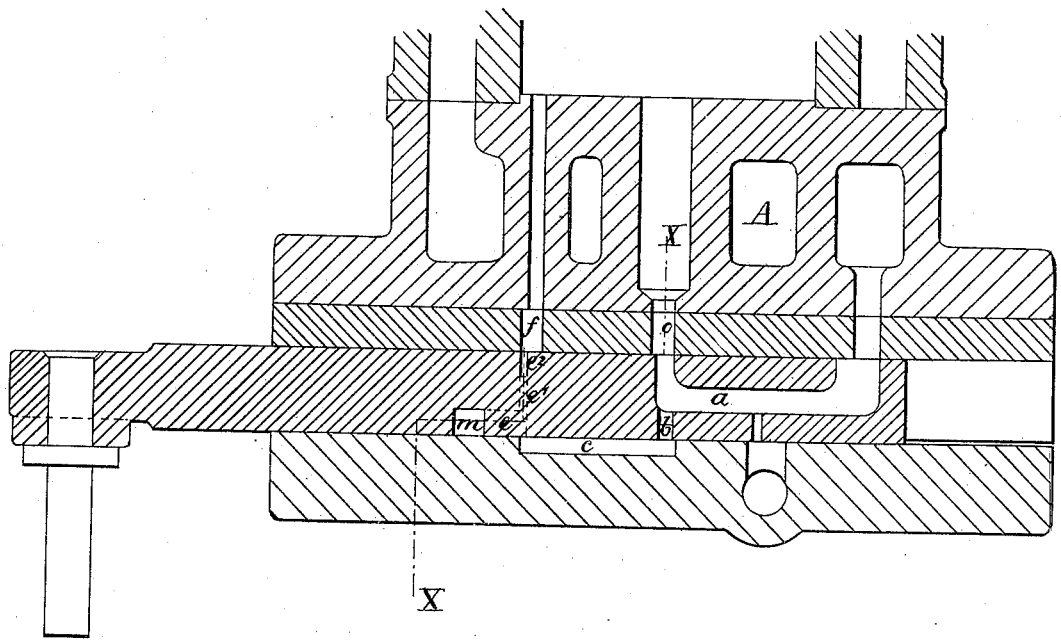

When the slide is in the position shown at Fig. 10 during the suction-stroke, the mixture of combustible gas and air formed in the passage $a$ passes thence into the cylinder partly through the port $o$ and partly through aperture $b$, channel $c$, passage $e\ e'\ e^2$, and subsidiary port $f$, so that already at the commencement of the compression-stroke the passage $e\ e'\ e^2$ is charged with combustible mixture. During the compression-stroke this passage and the cavity $m$ are supplied with combustible mixture through the apertures $i'$ and $i^2$ and groove $d$. As in the said gas-motor engines the pressure gradually increases during the compression-stroke, the flame would, without special provision, at first be only small in the cavity $m$, and would gradually increase in size.

In order to maintain a flame of constant size, notwithstanding the increase of pressure, the passage through which the gaseous mixture is supplied to the firing-passage is provided with two or more holes, $i'\ i^2$. At the commencement of the compression-stroke all the holes communicate with the firing-passage, the slide being then in the position shown at Fig. 12. As the stroke proceeds, the communication between the holes $i'\ i^2$ and the channel $d$ is gradually cut off by the movement of the slide, so as to reduce the supply, until, at the moment when the passage $e\ e'\ e^2$ begins to communicate with the cylinder-port so as to fire the charge, as at Fig. 11, only one hole, $i'$, of small area, communicates with the firing-passage. This arrangement is also shown in constructions previously described.

Fig. 13 shows a diagram of the action of the slide of the last-described arrangement. In this case, also, the slide-crank makes one revolution to every two of the engine-shaft, the former being situated at right angles to the crank of the latter, so that at the moment of firing the slide-crank is situated at the point 1.

Having thus described the nature of my invention and the best means I know for carrying the same into practical effect, I claim—

1. In a gas-motor-engine slide, a firing-passage of considerable length and small sectional area, communicating at one end with the igniting-cavity $m$, and having at its other end an extended communication or several communications with the cylinder-port, substantially as and for the purposes set forth.

2. In a gas-motor engine, the combination of the igniting-cavity $m$, firing-passage $e\ e'\ e^2$, and channel $d$ of the slide with two or more apertures, $i'\ i^2$, in the cylinder-face, through which the combustible mixture enters the firing-passage, substantially as and for the purpose set forth.

3. In a gas-motor engine, the combination of the igniting-cavity $m$, firing-passage $e\ e'\ e^2$, charging-passage $a$, and hole $b$ of the slide with the channel $c$ in the cylinder-cover and subsidiary cylinder-port $f$, substantially as and for the purpose set forth.

In testimony whereof I have signed my name to this specification, in presence of two subscribing witnesses, this 12th day of October, A. D. 1885.

NICOLAUS AUGUST OTTO.

Witnesses:
WILHELM RINCK,
PETER LANGEN.